United States Patent
Hsu et al.

(10) Patent No.: US 7,131,764 B2
(45) Date of Patent: Nov. 7, 2006

(54) BACKLIGHT APPARATUS

(75) Inventors: Chien-Hung Hsu, Hsinchu (TW);
Wen-Yung Huang, Hsinchu (TW);
Ming-Dah Liu, Hsinchu (TW);
Bor-Jyh Pan, Hsinchu (TW)

(73) Assignee: Nano Precision Corporation, Hsinchu (TW)

( * ) Notice: Subject to any disclaimer, the term of this patent is extended or adjusted under 35 U.S.C. 154(b) by 0 days.

(21) Appl. No.: 10/908,919

(22) Filed: Jun. 1, 2005

(65) Prior Publication Data
US 2005/0270802 A1 Dec. 8, 2005

(30) Foreign Application Priority Data
Jun. 7, 2004 (TW) .............................. 93116366 A

(51) Int. Cl.
*F21V 7/04* (2006.01)
(52) U.S. Cl. .................. 362/623; 362/625; 362/615
(58) Field of Classification Search ............... 362/600, 362/603, 615, 616, 617, 619, 620, 623, 625 362/626, 628
See application file for complete search history.

(56) References Cited

U.S. PATENT DOCUMENTS

| 5,961,198 | A | 10/1999 | Hira et al. |
| 6,412,968 | B1 | 7/2002 | Ohkawa |
| 6,447,136 | B1 * | 9/2002 | Liu et al. ..................... 362/625 |
| 6,568,819 | B1 | 5/2003 | Yamazaki et al. |
| 6,755,546 | B1 * | 6/2004 | Ohkawa ..................... 362/626 |
| 6,808,281 | B1 * | 10/2004 | Ho .............................. 362/600 |

FOREIGN PATENT DOCUMENTS

| JP | 8-43635 | 2/1996 |
| JP | 11-52370 | 2/1999 |
| JP | 11-306833 | 11/1999 |
| JP | 2000-221330 | 8/2000 |
| JP | 2002-156531 | 5/2002 |
| JP | 2002-170417 | 6/2002 |
| JP | 2003-43266 | 2/2003 |
| TW | 407216 | 10/2000 |
| TW | 487170 | 5/2002 |
| TW | 585259 | 4/2004 |

* cited by examiner

*Primary Examiner*—Y. My Quach-Lee
(74) *Attorney, Agent, or Firm*—Winston Hsu

(57) ABSTRACT

A backlight apparatus includes a guiding element and a light source disposed at one side of the guiding element. There is a plurality of reflective patterns at the bottom surface of the guiding element. Each reflective pattern is composed of at least one concavity and at least one convexity. The concavity is disposed at the rim around the convexity. As the light source emits light to the guiding element, the reflective area is increased by the concavity of the reflective pattern for increasing the reflecting effect and for distributing the brightness more uniformly, and thereby higher brightness and uniformity can be achieved.

12 Claims, 7 Drawing Sheets

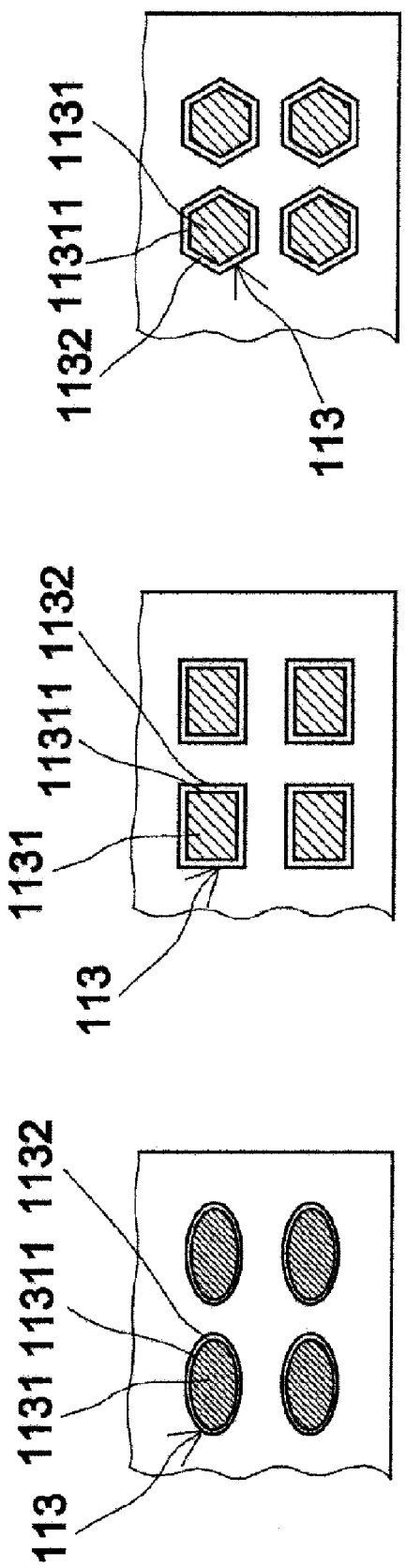

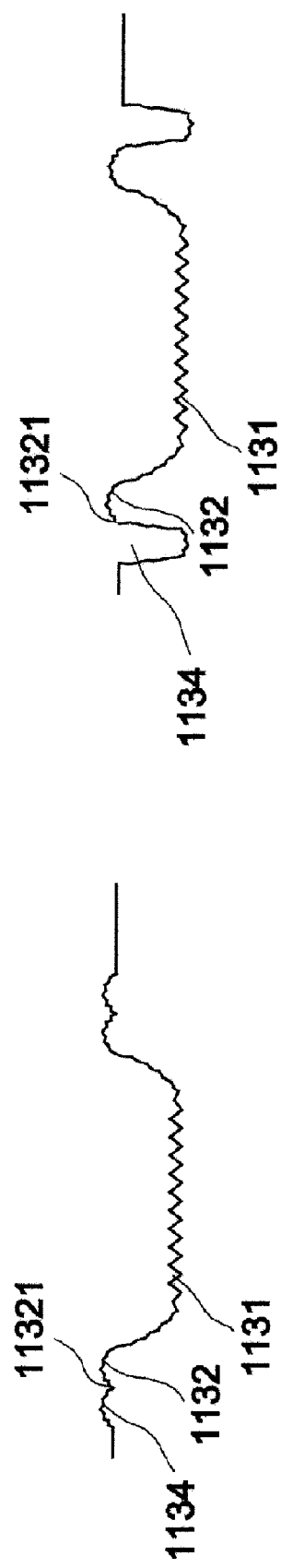
FIG. 5A
FIG. 5B
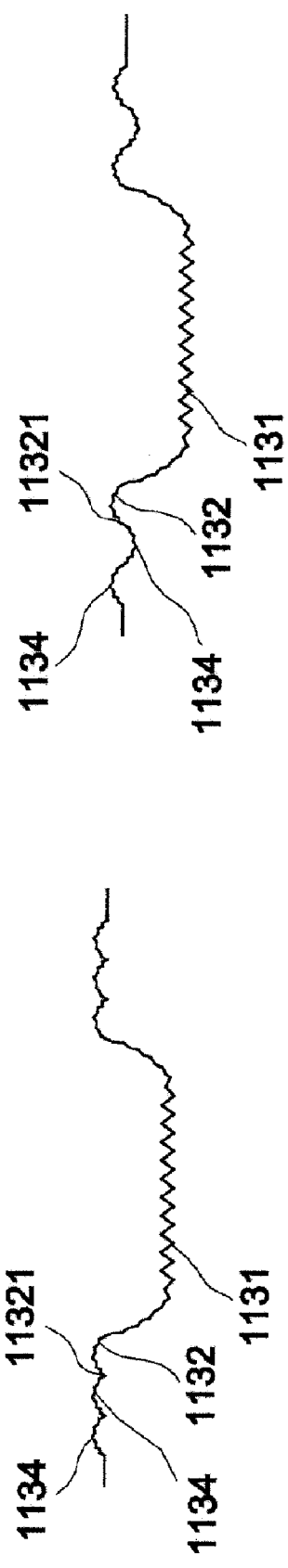
FIG. 5C
FIG. 5D

BACKLIGHT APPARATUS

BACKGROUND OF THE INVENTION

1. Field of the Invention

The present invention relates to a backlight apparatus, and more particularly, to a guiding element in the backlight apparatus.

2. Description of the Prior Art

A liquid crystal panel does not emit light itself, and therefore a backlight apparatus is needed for the liquid crystal panel to display images normally.

Please refer to FIG. 1. Conventionally a backlight apparatus of a liquid crystal panel includes a light source 1, a reflector 2, a light guide plate 3 and a reflective plate 4. The light source 1 provides light for the backlight apparatus, and the reflector 2 surrounds the light source 1 for reflecting light provided from the light source 1 into the light guide plate 3. The light guide plate has a front surface 3C and a rear surface 3B. An end 3A of the light guide plate is adjacent to the light source 1 for receiving light from the light source 1. There is a plurality of reflective patterns 3D disposed on the rear surface 3B, and the reflective pattern 3D is a convexity or a concavity. The reflective plate 4 is disposed below the light guide plate 3 for reflecting light passing through the rear surface 3B of the light guide plate 3 back to the light guide plate 3. After the light from the light source 1 enters the light guide plate 3 through the end 3A, the light is repeatedly total internally reflected between the front surface 3C and the rear surface 3B of the light guide plate 3 while proceeding away from the light source 1. The reflective pattern 3D changes the reflective angles of the light for refracting the light out of the light guide plate 3 in order to provide light for the liquid crystal panel.

Please refer to FIG. 2. The conventional reflective pattern 3D is a single convexity or a single concavity. Take the convex reflective pattern 3D for example; the reflective pattern 3D is a single convexity when viewed from any direction, and only the effective reflective area 3D1 and 3D2 (the areas facing the light source) can reflect or refract the light to the front surface 3C. Thus, light is not reflected or refracted out of the light guide plate effectively and cannot proceed away from the light source, causing the uniformity of light in the whole light guide plate to be not good.

Consequently, it is to be solved that how to increase the reflecting effect of the light guide plate and raise the uniformity of light in the light guide plate.

SUMMARY OF THE INVENTION

One objective of the present invention is to provide a backlight apparatus, wherein there is a ring concavity or a ring convexity around the reflective pattern for increasing the reflective area and raising both the brightness and uniformity of light.

For achieving the above objective, the backlight apparatus of the present invention includes a guiding element and a light source disposed at one side of the guiding element. There is a plurality of reflective patterns at the bottom surface of the guiding element. Each reflective pattern is composed of at least one concavity and at least one convexity. The concavity is disposed at the rim around the convexity. As the light source emits light to the guiding element, the reflective area is increased by the concavity of the reflective pattern for increasing the reflecting effect and for distributing the brightness more uniformly, and thereby higher brightness and uniformity can be achieved.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4A, FIG. 4B and FIG. 4C are structural views showing reflective patterns of the backlight apparatus in each preferred embodiment of the present invention.

FIG. 5A, FIG. 5B, FIG. 5C, and FIG. 5D are structural views showing ring parts of reflective patterns of the backlight apparatus in each preferred embodiment of the present invention.

DETAILED DESCRIPTION

The technical method taken for achieving the above objective and other effects in the present invention are illustrated with drawings in the following two preferred embodiments.

Figure 1:
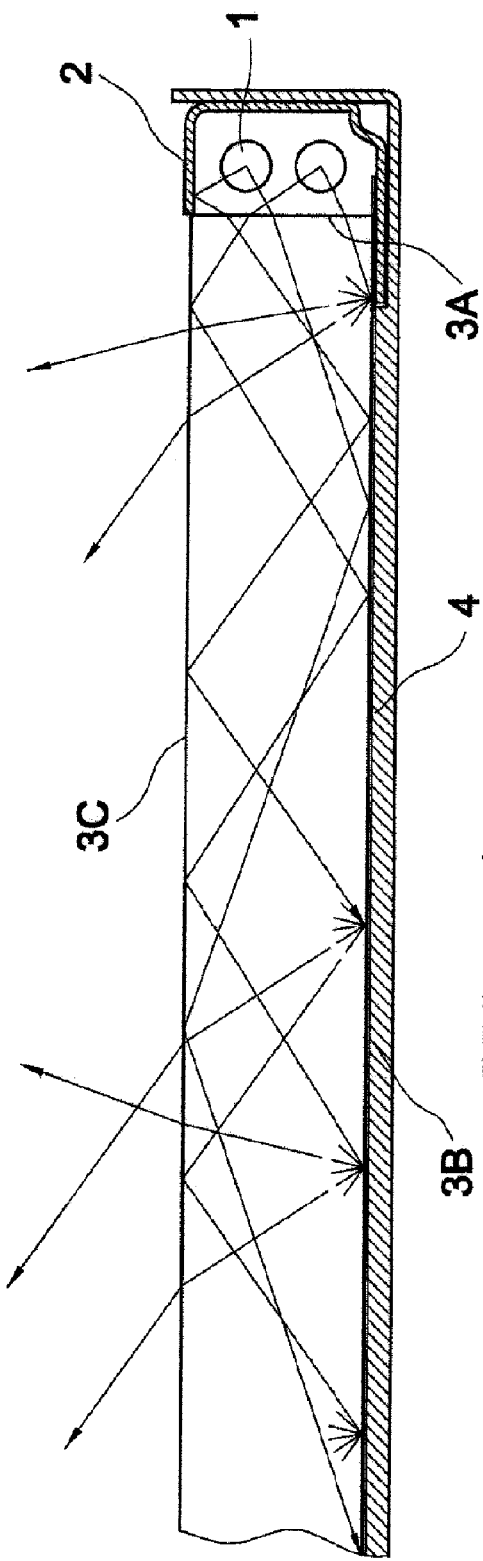
FIG. 1 is a schematic view showing a conventional backlight apparatus.
Figure 2:
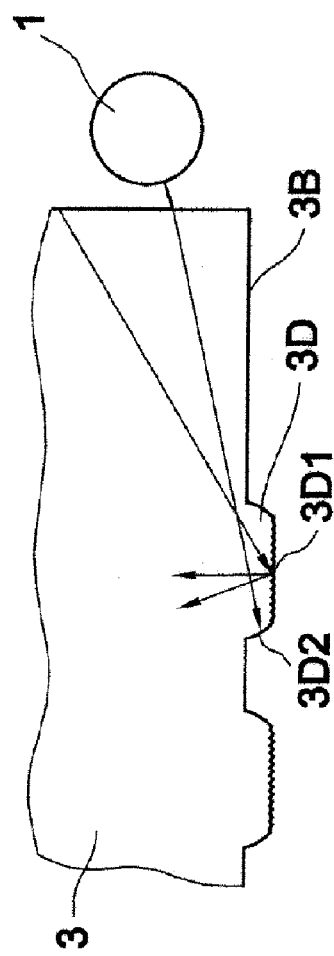
FIG. 2 is a partial enlarged view of a conventional backlight apparatus.
Figure 3A:
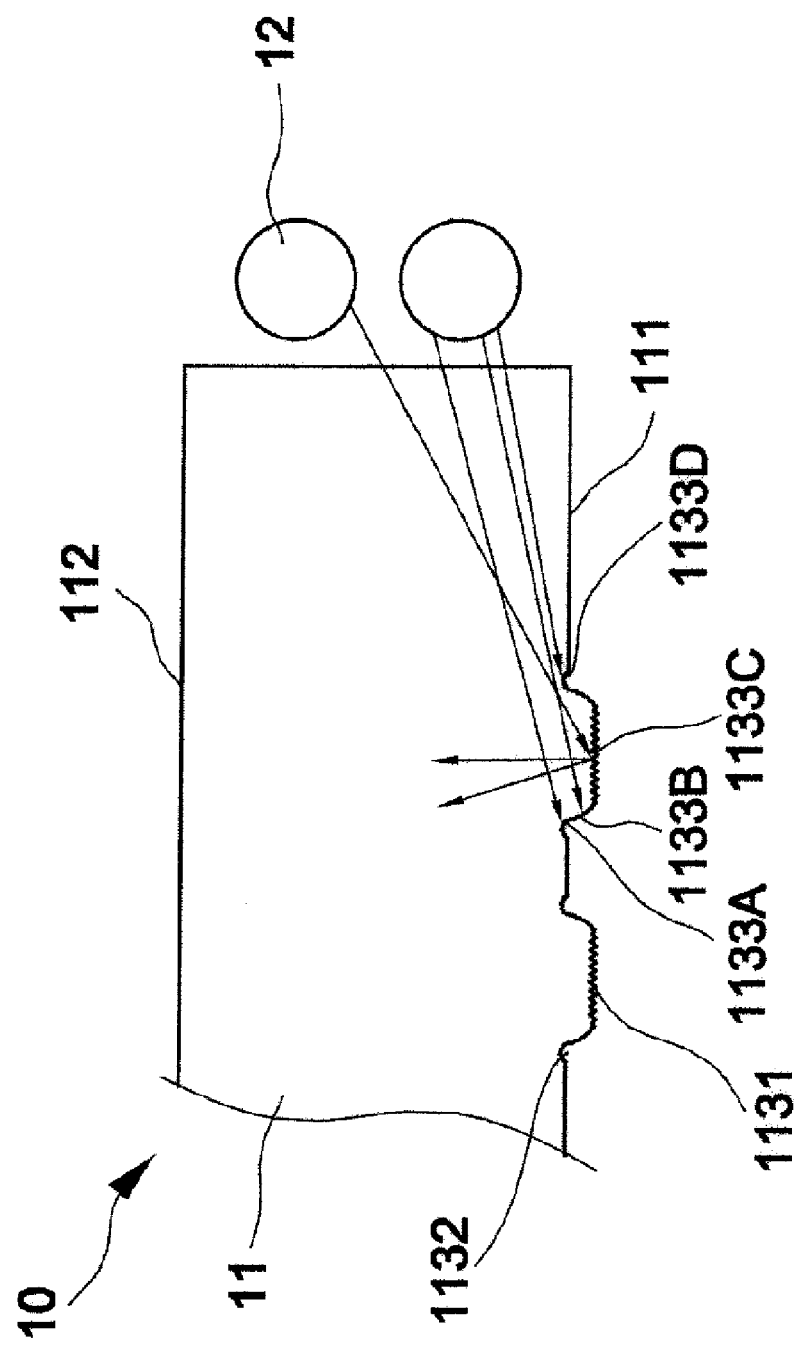
FIG. 3A is a lateral view showing the backlight apparatus of the present invention.
Figure 3B:
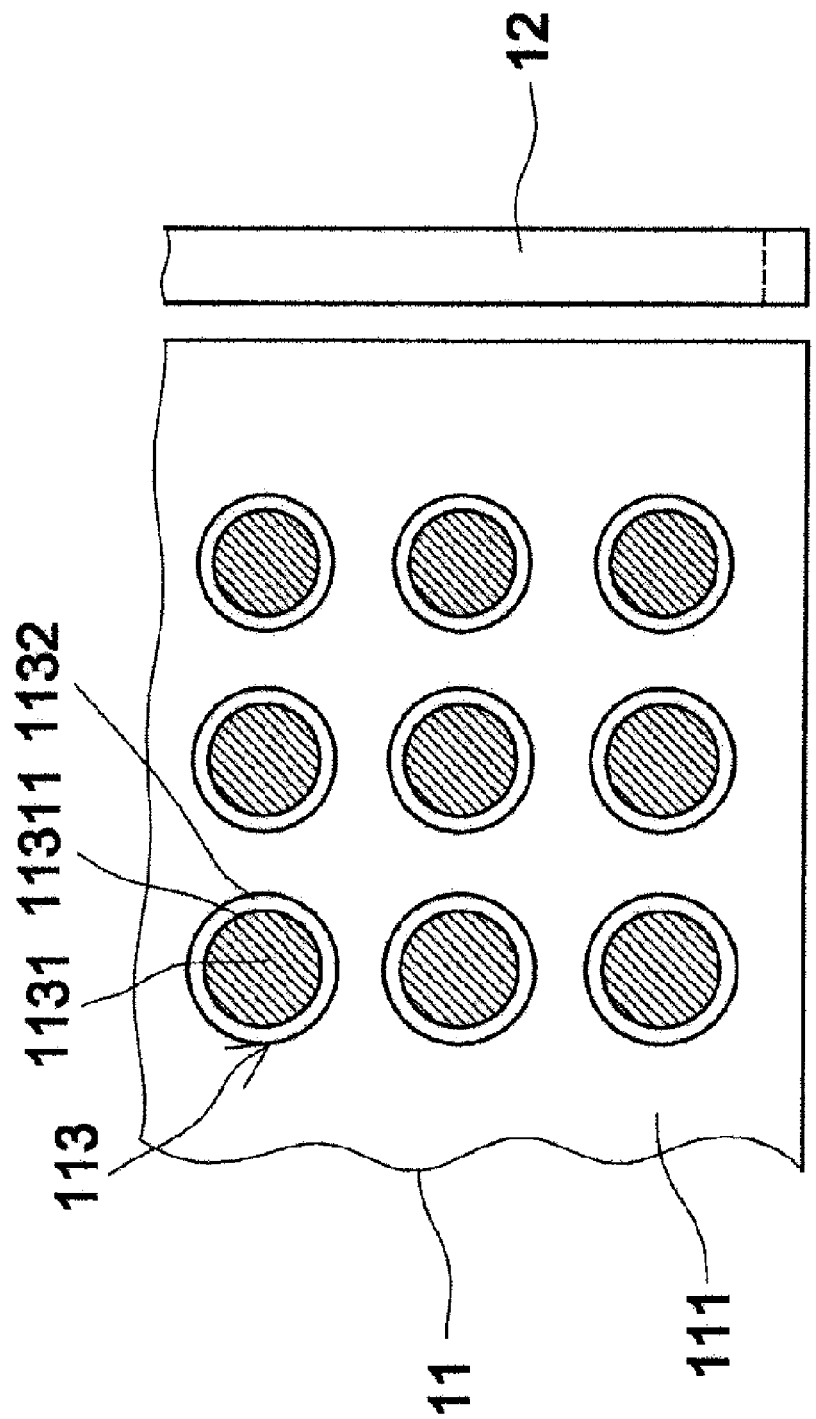
FIG. 3B is a cross-section view showing the backlight apparatus of the present invention.

Please refer to FIG. 3A and FIG. 3B. In the first preferred embodiment, the backlight apparatus 10 includes a guiding element 11 and a light source 12 disposed on at least one lateral side of the guiding element 11. The guiding element 11 has a bottom surface 111 and an emitting surface 112. There is a plurality of reflective patterns 113 disposed on the bottom surface 111. The reflective patterns 113 are distributed with a proper distance between one another on the bottom surface 111. Each reflective pattern 113 is composed of a convexity 1131 and a concavity 1132 disposed at the rim 11311 around the convexity 1131. The shape and size of the convexity 1131 and the concavity 1132 are configured according to the location of the light source. The convexity 1131 is a cylinder, an angular column or a column of other shapes. The concavity 1132 is of a ring shape that is similar to the rim 11311 of the convexity 1131. For example, if the rim 11311 of the convexity 1131 is of a circular shape, the concavity 1132 is circular (as shown in FIG. 3B). In addition, the concavity 1132 can be an ellipse (as shown in FIG. 4A), a rectangle (as shown in FIG. 4B) or a polygon (as shown in FIG. 4C). The light source 12 is disposed on at least one side of the guiding element 11 for emitting light into the guiding element 11.

Please refer to FIG. 3 again. As light from the light source 12 enters the guiding element 11, the light proceeds away from the light source 12 and is refracted out of the guiding element 11 by four reflective areas 1133A, 1133B, 1133C and 1133D formed by the concavity 1132 and the convexity 1131 of the reflective pattern 113. Thereby the brightness of the liquid crystal panel (not shown in the figures) is achieved.

Because of the ring-shaped concavity formed at the rim of the convexity, there are more areas (1133A and 1133D) of the ring-shaped concavity facing the light source besides the areas (1133B and 1133C) of the convexity facing the light source, and thereby the reflective pattern has more reflective surfaces for reflecting light. Compared to the conventional reflective pattern that has only two reflective surfaces, the present invention increases the reflecting effect of light and distributes the brightness more uniformly by using more reflective areas, and thereby more brightness and more uniformity are achieved.

In addition, the bottom of the concavity and the surface of the convexity can be rough surfaces for the light projected thereon to diffuse in a multidirectional way, and thereby the light is emitted out of the emitting surface 112 more uniformly.

The roughness of the concavity 1132 can be from Ra 0.05 mm to Ra 5.0 mm, and the depth thereof can be from 0.001 mm to 0.5 mm. The roughness of the convexity 1131 can be from Ra 0.05 mm to Ra 5.0 mm, and the height thereof can be from 0.001 mm to 0.5 mm while the diameter thereof can be from 0.03 mm to 2.0 mm. Thereby, better optical effect is achieved.

Further, at least one ring part 1134 can be disposed mutually connected in sequence from the rim 11321 of the concavity 1132 toward outside for increasing the reflective area. The ring parts can be all convexities of a ring shape (as shown in FIG. 5B), all concavities of a ring shape (as shown in FIG. 5A and FIG. 5C) or some are convexities of a ring shape and some are concavities of a ring shape (as shown in FIG. 5D). The shape and size of the ring part are configured according to the location of the light source. As shown in FIG. 5B, the depth of the ring part is the same as that of the convexity 1131.

Figure 6:
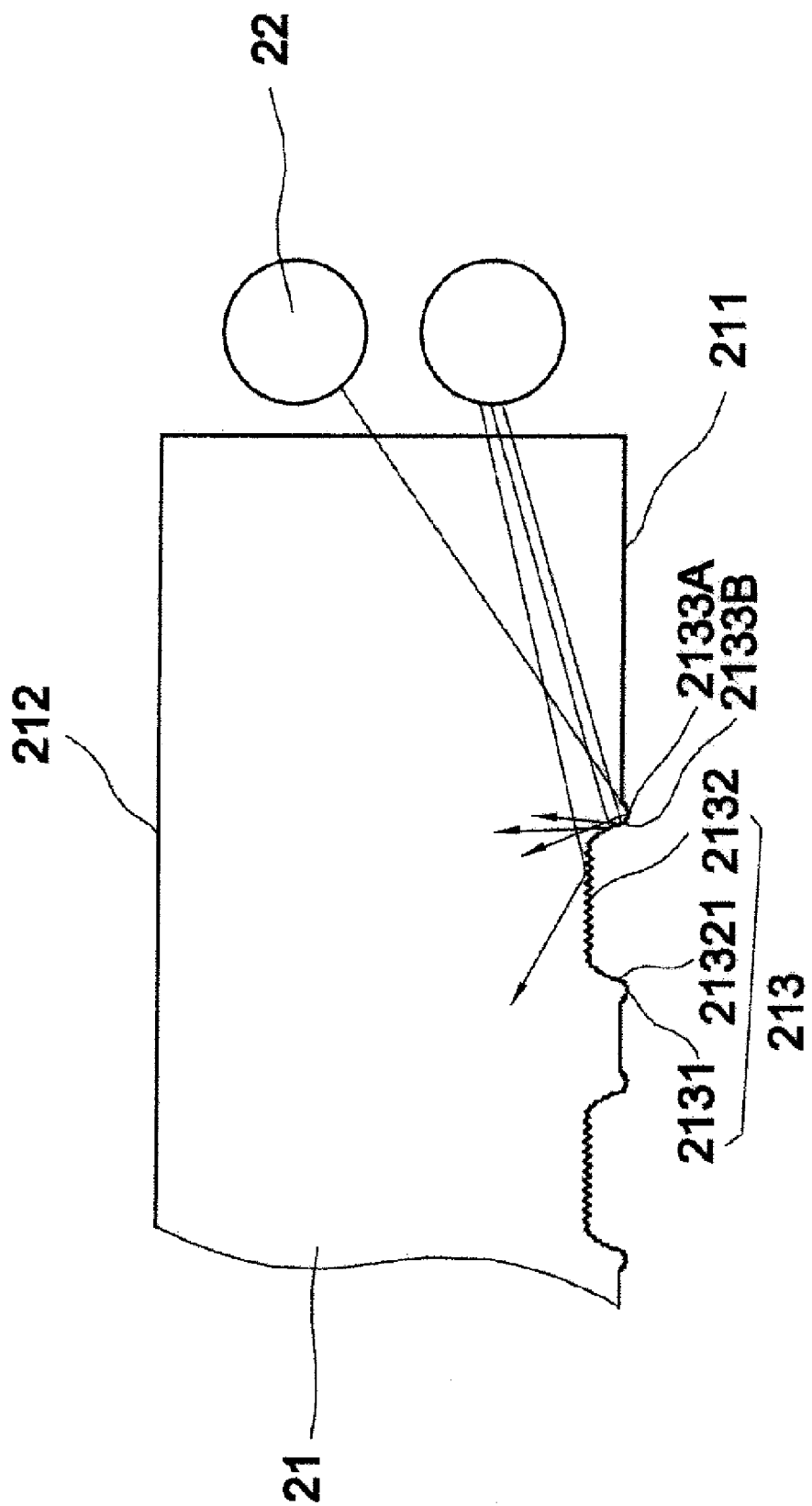
FIG. 6 is a lateral view showing the backlight apparatus in another preferred embodiment of the present invention.

Further, please refer to FIG. 6. In the second preferred embodiment, the guiding element 21 has a bottom surface 211 and an emitting surface 212. There is a plurality of reflective patterns 213 disposed on the bottom surface 211. The reflective patterns 213 are distributed with a proper distance between one another on the bottom surface 211. Each reflective pattern 213 is composed of a concavity 2132 and a convexity 2131 disposed at the rim 21321 around the concavity 2132. The convexity 2131 is of a ring shape that is similar to the rim 21321 of the concavity 2132. As the light from the light source 22 enters the guiding element 21, the area on the concavity 2132 of the reflective pattern and facing the light source can be used for reflecting light, while the reflective areas 2133A and 2133B on the convexity 2131 and facing the light source can also be used for reflecting light. By more reflective areas, the present invention increases the reflecting effect of light and distributes the brightness more uniformly, and thereby more brighntness and more uniformity are achieved.

Figure 7C:
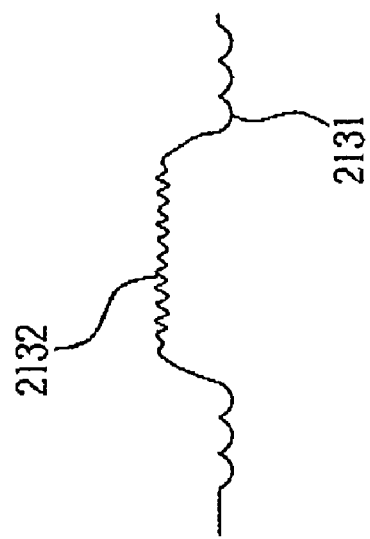
FIG. 7A, FIG. 7B, FIG. 7C, and FIG. 7D are structural views showing ring parts of reflective patterns of the backlight apparatus of FIG. 6.
Figure 7A:
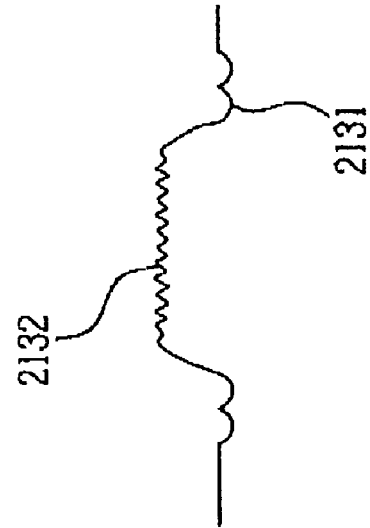
Figure 7D:
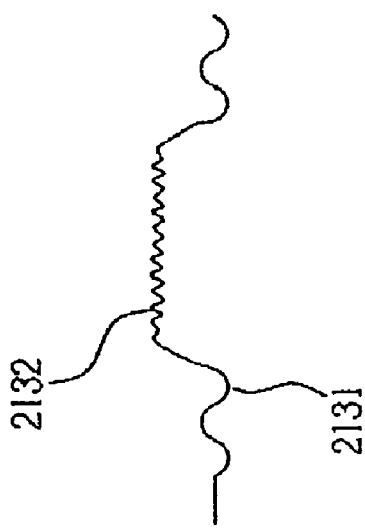
Figure 7B:
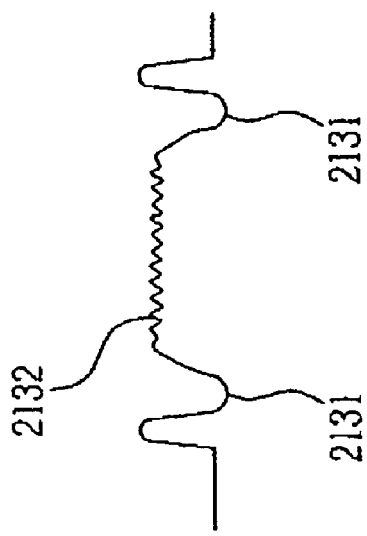

Furthermore, at least one ring part can be disposed at the rim of the convexity 2131. The ring parts can be all convexities of a ring shape (as shown in FIG. 7A and FIG. 7C), all concavities of a ring shape (as shown in FIG. 7B) or some are convexities of a ring shape and some are concavities of a ring shape (as shown in FIG. 7D).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight apparatus, comprising:
   a guiding element having a bottom surface and an emitting surface, the bottom surface having a plurality of reflective patterns, each reflective pattern being composed of a concavity and a convexity, the concavity being disposed at a rim of the convexity; and
   at least one light source disposed on at least one lateral side of the guiding element for emitting light to the guiding element;
   wherein at least one ring part is disposed mutually connected in sequence from the rim of the convexity toward outside of the convexity.

2. The backlight apparatus according to claim 1, wherein the concavity is of a ring shape and the shape is substantially the same as the shape of the rim of the convexity.

3. The backlight apparatus according to claim 1, wherein the ring part is a convexity of a ring shape or a concavity of a ring shape.

4. The backlight apparatus according to claim 1, wherein the shape of the concavity is circular, elliptic, rectangular or polygonal.

5. The backlight apparatus according to claim 1, wherein a bottom of the concavity is a rough surface.

6. A backlight apparatus, comprising:
   a guiding element having a bottom surface and an emitting surface, the bottom surface having a plurality of reflective patterns, each reflective pattern being composed of a concavity and a convexity, the convexity being disposed at a rim of the concavity; and
   at least one light source disposed on at least one lateral sides side of the guiding element for emitting light to the guiding element;
   wherein a surface of the convexity is a rough surface.

7. The backlight apparatus according to claim 6, wherein the convexity is of a ring shape and the shape is substantially the same as the shape of the rim of the concavity.

8. The backlight apparatus according to claim 6, wherein the shape of the convexity is circular, elliptic, rectangular or polygonal.

9. The backlight apparatus according to claim 6, wherein a bottom of the concavity is a rough surface.

10. The backlight apparatus according to claim 6, wherein at least one ring part is disposed mutually connected in sequence from the rim of the concavity toward outside of the concavity.

11. The backlight apparatus according to claim 10, wherein the ring part is a convexity of a ring shape or a concavity of a ring shape.

12. A back light apparatus, comprising:
   a guiding element having a bottom surface and an emitting surface, the bottom surface having a plurality of reflective patterns, each reflective pattern being composed of a concavity and a convexity, the concavity being disposed at a rim of the convexity; and
   at least one light source disposed on at least one lateral side of the guiding clement for emitting light to the guiding element;
   wherein a roughness of the concavity is from Ra 0.05 mm to Ra 5.0 mm and the depth thereof is from 0.001 mm to 0.5 mm, a roughness of the convexity being from Ra 0.05 mm to Ra 5.0 mm and the height thereof being from 0.001 mm to 0.5 mm and the diameter thereof being from 0.03 mm to 2.0 mm.

* * * * *